US007821968B2

(12) United States Patent
Keeni et al.

(10) Patent No.: US 7,821,968 B2
(45) Date of Patent: Oct. 26, 2010

(54) NETWORK MAP CREATING METHOD

(75) Inventors: Glenn Mansfield Keeni, Miyagi (JP); Takeo Saito, Miyagi (JP)

(73) Assignee: Cyber Solutions, Inc., Sendai-Shi (JP)

( * ) Notice: Subject to any disclaimer, the term of this patent is extended or adjusted under 35 U.S.C. 154(b) by 557 days.

(21) Appl. No.: 11/919,516

(22) PCT Filed: Apr. 27, 2006

(86) PCT No.: PCT/JP2006/308855
§ 371 (c)(1),
(2), (4) Date: Nov. 2, 2007

(87) PCT Pub. No.: WO2006/118203
PCT Pub. Date: Nov. 9, 2006

(65) Prior Publication Data
US 2009/0028067 A1    Jan. 29, 2009

(30) Foreign Application Priority Data
Apr. 27, 2005    (JP) .............................. 2005-129370

(51) Int. Cl.
*H04L 12/28* (2006.01)
(52) U.S. Cl. ...................................... 370/254; 370/392
(58) Field of Classification Search ................ 370/392, 370/255, 331, 252; 709/223, 238
See application file for complete search history.

(56) References Cited
U.S. PATENT DOCUMENTS

| 6,308,220 | B1* | 10/2001 | Mathur ........................ 709/238 |
| 6,442,144 | B1* | 8/2002 | Hansen et al. ............... 370/255 |
| 6,604,136 | B1* | 8/2003 | Chang et al. ................ 709/223 |
| 7,286,538 | B2* | 10/2007 | Song et al. .................. 370/392 |
| 2003/0172147 | A1* | 9/2003 | Chang et al. ................ 709/223 |
| 2004/0019876 | A1* | 1/2004 | Dravida et al. ............... 717/117 |
| 2005/0270986 | A1* | 12/2005 | Watanabe et al. ........... 370/252 |
| 2008/0130572 | A1* | 6/2008 | Zhang et al. ................. 370/331 |
| 2009/0019141 | A1* | 1/2009 | Bush et al. ................... 709/223 |

FOREIGN PATENT DOCUMENTS

JP    6-120968 A    4/1994

OTHER PUBLICATIONS

Mizutani, "TCO Sakugen ni Mukete, Network Kanri no Kadai to Approach (Dai 4 Kai) SNMP no Kihonteki na Tsukaikata," Back Office Mag., vol. 3, No. 3, p. 170 (Mar. 1, 1999).
Hitachi, Ltd., "Version 5 Togo Network Kanri System Network Node Manager Network Kanri Guide Kyotsu Manual Tebiki Sosasho," 3000-3-721, $1^{st}$ Ed., p. 7-15, chap. 7.2.3 (Apr. 30, 1999).

* cited by examiner

*Primary Examiner*—Thong H Vu
(74) *Attorney, Agent, or Firm*—Young & Thompson

(57) ABSTRACT

By synthesizing the map of an entire network, it provides a method for detecting OSI Reference Model layer-2 switches and evaluating the status of the inter-connection of the layer-2 switches. The NMT (102) which implements the SNMP manager queries the specified management IP-addresses and receives responses from the SNMP agents implemented on the layer-2 switches (103,104,105). From the management information in the responses, the existence of the layer-2 switches is confirmed and the MAC address and port information mapping table MvP table is constructed. Based on the MvP table the inter-connection information of the layer-2 switches is detected.

5 Claims, 6 Drawing Sheets

FIGURE 3

MvP table (before normalization)

| MAC Address | Switch port that detects MAC address {M(H),M(Si)} | | |
|---|---|---|---|
| $M(H)$ | $P[S_1,10]$ | $P[S_2,6]$ | $P[S_3,6]$ |
| $M(S_1)$ | $P[S_2,6]$ | $P[S_3,6]$ | |
| $M(S_2)$ | $P[S_1,16]$ | $P[S_3,6]$ | |
| $M(S_3)$ | $P[S_1,16]$ | $P[S_2,15]$ | |

FIGURE 4

MvP table (after normalization)

| MAC Address | Switch port that detects MAC address {M(H),M(Si)} | | |
|---|---|---|---|
| $M(H)$ | $P[S_1,10]$ | $P[S_2,6]$ | $P[S_3,6]$ |
| $M(S_1)$ | | | |
| $M(S_2)$ | $P[S_1,16]$ | | |
| $M(S_3)$ | $P[S_1,16]$ | $P[S_2,15]$ | |

NETWORK MAP CREATING METHOD

TECHNICAL FIELD

This invention is about the technology to generate the map of a network using SNMP (Simple Network Management Protocol), to monitor the state of the network elements and the communication links.

BACKGROUND TECHNOLOGY

The present day LANs span wide areas and are interconnected through wide area Ethernet (a registered trademark) protocol. SNMP has been standardized for the management of the network and the numerous constituent network elements. Configuration management is one aspect of network management. One example of a network is a LAN. Configuration management involves automatic detection of elements in the network, automated generation of the network map with information on the interconnection of the network elements and display of the map along with the status of each network element on a console enabling the human manager or network operator to intuitively grasp the status of the network and the constituent elements and thereby facilitates network operation and management.

DISCLOSURE OF INVENTION

The Problem that the Invention is Going to Solve

However, there are some issues in automatically generating a network map, if there are multiple OSI Reference Model Layer-2 elements (layer-2 switches) in the network. In this case, the network becomes a logical hierarchical structure of switches and to generate the network map it is essential to detect the inter-switch and switch-terminal connection. This invention aims to address the above-mentioned issues, using a new algorithm to enable the discovery of the inter connections of the OSI Reference Model Layer-2 elements (inter-switch connections) and the connections of computers to the OSI Reference Model Layer-2 elements (switch-terminal connections), when there are one or more OSI Reference Model layer-2 elements in the network.

Means to Solve the Problem

To achieve the above target, the invention according to claim 13 is a Network Map generation method, the OSI reference model layer-2 switches are automatically discovered and the aforesaid layer-2 switches' inter-connections are automatically detected in the process of the Network Map automatic generation by automatic discovery of network devices or computers connected to the network, the first step is to use the network management information which the NMT (Network Monitor Terminal) obtains from the layer-2 switches, and generates the MvP table comprising of the mapping table M1 between the MAC address of the NMT and the ports of the layer-2 switches on which the aforesaid MAC address was detected and the table M2 mapping the MAC address of the layer-2 switches and the ports of the layer-2 switches on which the aforesaid MAC address was detected, and then, the second step is to compare the mapping table M1 and the mapping table M2 of the MvP table, and normalize the table by deleting an entry from the mapping table M2 when the corresponding port is seen in the mapping table M1 and the mapping table M2, and detect automatically the connection information between the layer-2 switches by using the MvP table at the end of the normalization.

The invention according to claim 14 is the Network Map generation method according to claim 13, the aforesaid second step is, with the aforesaid MvP table, (1) The set of the layer-2 switch ports, Row[M(H)], on which the MAC address M(H) of the NMT H were seen and the set of layer-2 switch ports Row{M(Si)} on which the MAC addresses M(Si) of the layer-2 switch Si ($1 \leq i \leq$ number of layer-2 switches) were seen are compared, and then, if a port is seen in the set Row[M(H)] and in the set Row{M(Si)}, the entry corresponding to the aforesaid port is deleted from the set Row{M(Si)}, and (2) In the set Row{M(Si)}, From the set Row{M(Sj)} ($1 \leq j \leq$ number of layer-2 switches) which has a singleton P[Sk,x] ($1 \leq k \leq$ number of layer-2 switches, x: port number), P[Sk,x] is selected, and (3) From the set Row{M(H)}, the element denoting the port P[Sj,y] [y: port number] of the layer-2 switch Sj is selected, and (4) The two elements selected by the aforesaid step yield the connection information P[Sk,x]$\Leftrightarrow$P[Sj,y].

The invention according to claim 15 is the Network Map generation method according to claim 14, after the execution of aforesaid (4) of the aforesaid second step, the element P[Sk,x] from Row[M(Si)] is deleted and then, the aforesaid steps (2)~(4) are repeated, and executed till the number of elements in all the sets Row[M(Si)] is reduced to 0.

The invention according to claim 16 is the Network Map generation method according to claim 14, if the same element exists in multiple sets of Row[M(Sj)], the conclusion is that at least one SNMP-disabled non-intelligent terminal exists between layer-2 switch Sj and layer-2 switch Sk, and then, the connection information having been described in the aforesaid (3)~(4) is complemented by considering the existence of a non-intelligent switch Sx.

The invention according to claim 17 is the Network Map generation method according to claim 13, in networks that have OSI reference model layer-3 switches, the NMT implementing the SNMP manager will send queries to the specified management IP address, from the response of the layer-3 switch implementing the SNMP agent the existence of the layer-3 switch is verified and the layer-2 switch connection information for networks connected via the layer-3 switch can be obtained in the same manner using the aforesaid first step and second step.

The method presented in this invention automatically detects OSI Reference Model Layer-2 elements and their inter-connections and thereby generates the network map. This makes it possible to display the network map along with the status of the constituent network elements on a console enabling the human manager or network operator to intuitively grasp the status of the network and the constituent elements and thereby facilitates network operation and management.

BRIEF DESCRIPTION OF THE DRAWING

FIG. 3 illustrates the contents of MvP table before the normalization.

FIG. 4 illustrates the contents of MvP table after the normalization.

EXPLANATION OF CODES USED IN THE DIAGRAMS

Network
102 Network Monitor Terminal (H)
103 Layer-2 switch ($S_1$)
104 Layer-2 switch ($S_2$)
105 Layer-2 switch ($S_3$)
106 Connection of layer-2 switch $S_1$ with layer-2 switch $S_2$
107 Connection of layer-2 switch $S_2$ with layer-2 switch $S_3$
501 Network
502 Layer-2 switch ($S_{10}$)
503 Layer-2 switch ($S_{11}$)
504 Layer-2 switch ($S_{12}$)
505 Non-intelligent hub ($S_x$)
506 Connection of layer-2 switch $S_{10}$ with switch $S_x$
507 Connection of layer-2 switch $S_x$ with switch $S_{11}$
508 Connection of layer-2 switch $S_x$ with switch $S_{12}$
601 Network
602 Network monitoring terminal (H)
603 Layer-2 switch ($S_1$)
604 Layer-2 switch ($S_2$)
605 Layer-3 switch ($S_3$)
606 Layer-2 switch ($S_4$)
607 Layer-2 switch ($S_5$)
608 Connection of Layer-2 switch $S_1$ with layer-2 switch $S_2$
609 Connection of Layer-2 switch $S_4$ with layer-2 switch $S_5$
610 Network 1
611 Network 2

THE BEST WAY TO PUT THE INVENTION INTO PRACTICE

A reference implementation (hereinafter referred to as "implementation") of the present invention to generate a network map will be described. The invention is not limited by the reference implementation.

Figure 1:
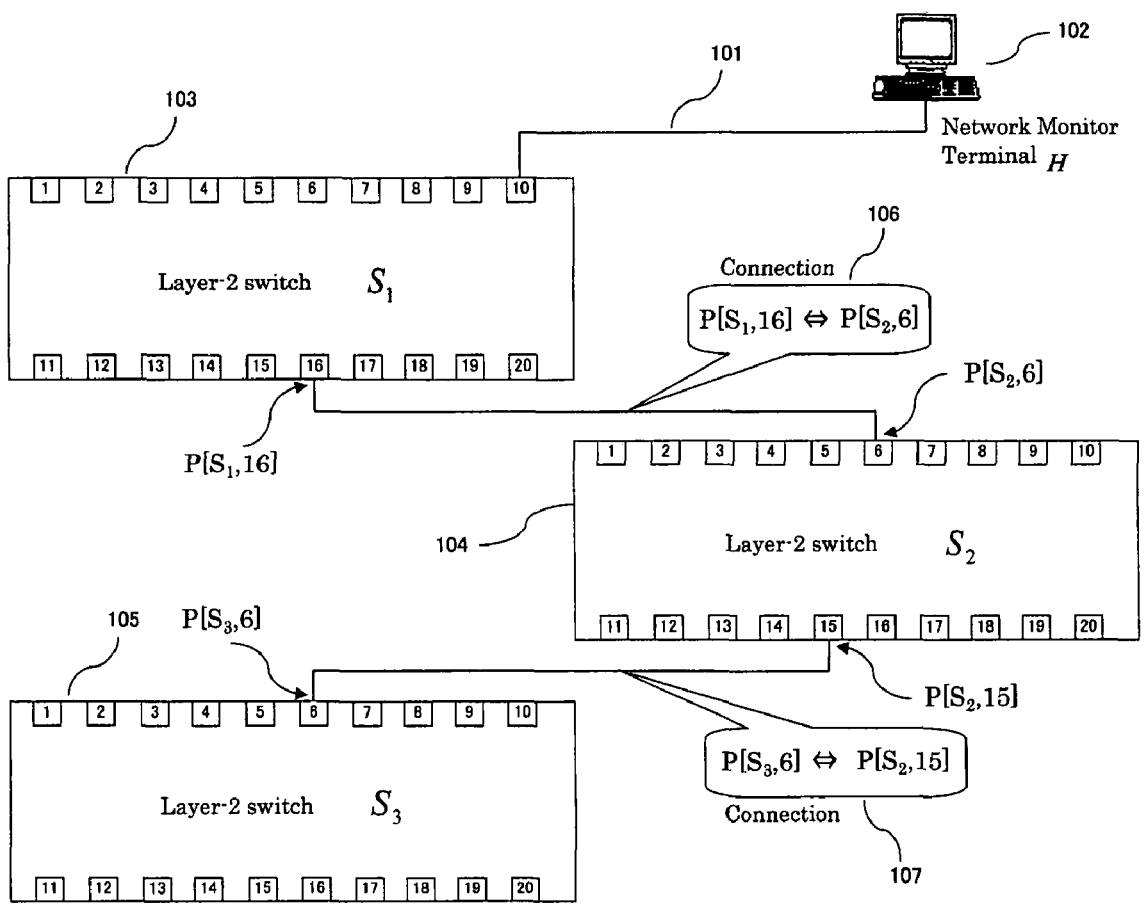
FIG. 1 is an example of the network configuration for a reference implementation of the present invention.

The network configuration diagram is shown in FIG. 1. There are OSI Reference Model Layer-2 elements, $S_1, S_2, S_3$ (103,104,105) that function as data link layer (layer-2) switches, in this network. Each switch implements an SNMP agent. The SNMP manager is implemented in the Network Monitor Terminal H (102).

The Network Monitor Terminal H (102) is connected to port #10 P [$S_1$, 10] of switch $S_1$ (103). Switch $S_1$ (103) and switch $S_2$ (104) are connected to ports P [$S_1$, 16] and P [$S_2$, 6], respectively. Switch $S_2$ (104) and switch $S_3$ (105) are connected to ports P [$S_2$, 15] and P [$S_3$, 6], respectively. By using the method of the present invention, the inter-switch port connection information, P [$S_1$, 16]⇔ P [$S_2$, 6], P [$S_2$, 15]⇔P [$S_3$, 6], is easily discovered.

Figure 2:
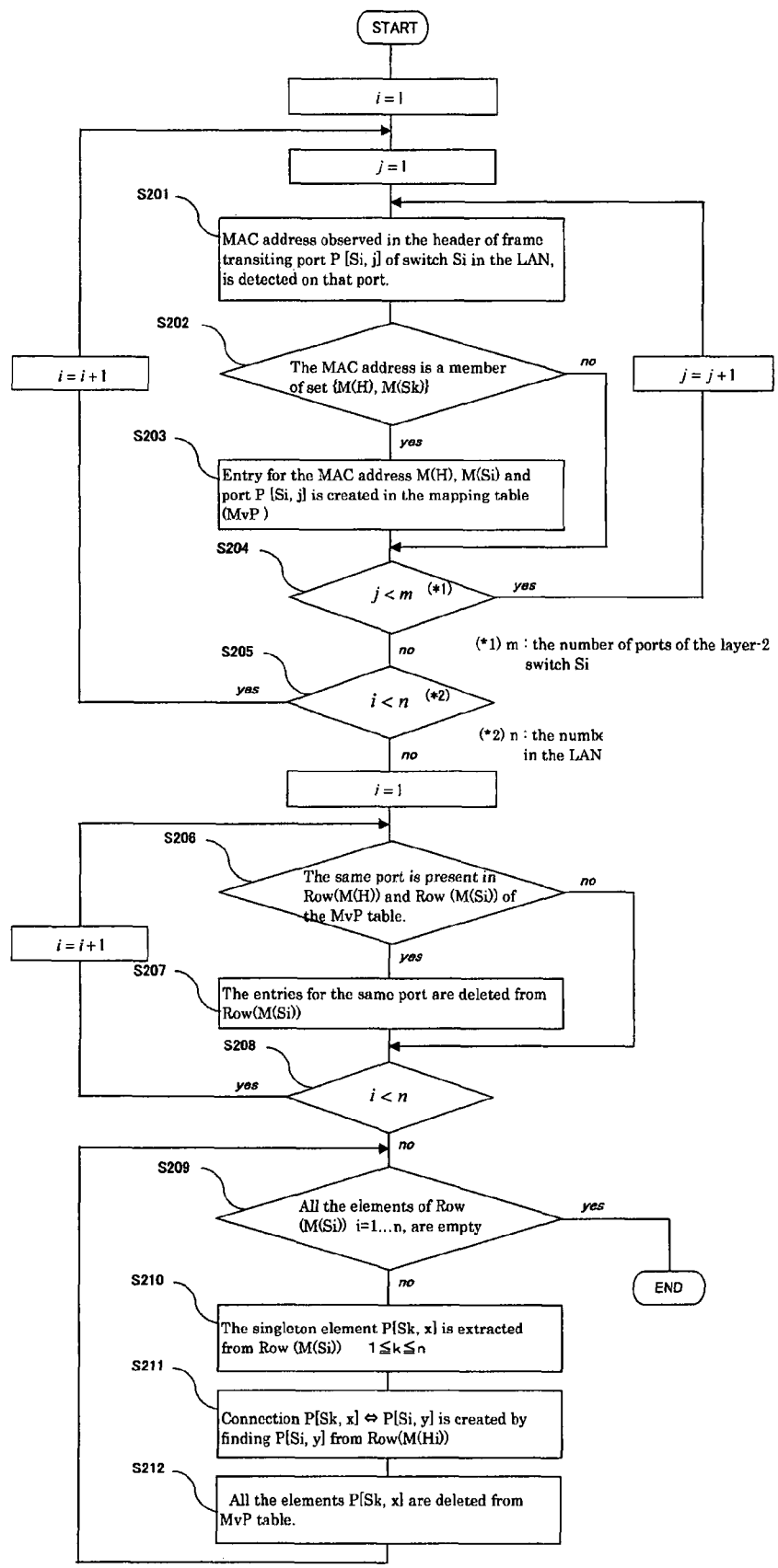
FIG. 2 is a flowchart illustrating algorithm for a reference implementation of the present invention.

Hereinafter, the details of the present invention will be described with reference to the flowchart shown in FIG. 2.

The Network Monitor Terminal, on which the SNMP Manager is implemented, sends queries to each of the IP-addresses of the SNMP agents implemented on the layer-2 switches. The management information in the response from the SNMP agents (MIB-I information defined in RFC1156, MIB-II information defined in RFC1213, BRIDGE-MIB information defined in RFC1493 and the IF-MIB information defined in RFC2863) contains information of the MAC addresses (S201) in the headers of the frames transited through all the ports P[$S_i$, j] of the respective layer-2 switches ($1 \leq i \leq n$, n: the number of layer-2 switches in the LAN, $1 \leq j \leq m$, m: the number of ports of the layer-2 switch $S_i$) If the IP-address of the SNMP agent of the layer-2 switch is not known apriori to the SNMP Manager, the Network Monitor Terminal may send a query to all the addresses within the range of its management domain. From the information in the response of the SNMP agent implemented on the layer-2 switches, the IP-address of the SNMP agent implemented on a layer-2 switch $S_i$ can be detected.

If the MAC address detected in S201 does not correspond to an address in the set {M(H), M($S_k$)} that address is ignored (S202), else the MAC address and the corresponding port P [$S_i$, j] on which the MAC address was seen is registered in the MvP (MAC versus Port mapping) table (S203). Here M(H) is the MAC address of the Network Monitor Terminal, M($S_k$) denotes the MAC address of the layer-2 switch $S_k$. ($1 \leq k \leq n$, n: the number of layer-2 switches in the LAN)

The processing S201~S203 is carried out for all the ports of the aforementioned switch. (S204)

The processing S201~S204 is carried out for all the layer-2 switches in the LAN(S205).

At this stage the MvP table shown in FIG. 3 is generated.

Next the MvP table generated in step S205 is normalized. The set of ports, Row(M(H)), on which the MAC address of the NMT, M(H) is detected, is compared with the set of ports Row(M(Si)). If the two sets contain a common element (port), that (element) port is deleted from Row (M(Si)). (S207)

The processing detailed in S206~S207 is carried out for all the entries of the MvP table. S208. The contents of the MvP table at this stage are shown in FIG. 4.

Next, the inter-switch connections are extracted from the normalized MvP table. First from among the set of ports Row(M(Si)), on which the MAC address of switch Si has been detected, a set which has a singleton element is selected, the aforementioned singleton element P[$S_k$, x] is extracted. (S210). Here $1 \leq x \leq m$ (m: number of ports of switch $S_k$)

From the singleton set, Row(M(Si)), selected in S210, the element $S_i$, y] corresponding to switch Si is selected and the connection P[$S_k$, x]⇔[$S_i$, y] is synthesized (S211). Here $1 \leq y \leq m$ (m: number of ports of Switch $S_i$). The example of FIG. 4 demonstrates the synthesis of connection P [$S_1$, 16]⇔[$S_2$, 6].

After synthesizing the connection in S211, the element P [$S_k$, x] is deleted from all the entries of the MvP table. In the example of FIG. 4, element P [S1, 16] is deleted from the set Row (M S2) and the set Row (M (S3).

The steps S210~S212 are repeated until all the entries of set Row(M(Si)) have been deleted (S209). After all the connections are synthesized, and elements of all the entries of set (M($S_i$)) are empty, the algorithm terminates. The Example of FIG. 4 demonstrates the synthesis of connection P [$S_2$, 15]⇔P [$S_3$, 6].

Figure 5:
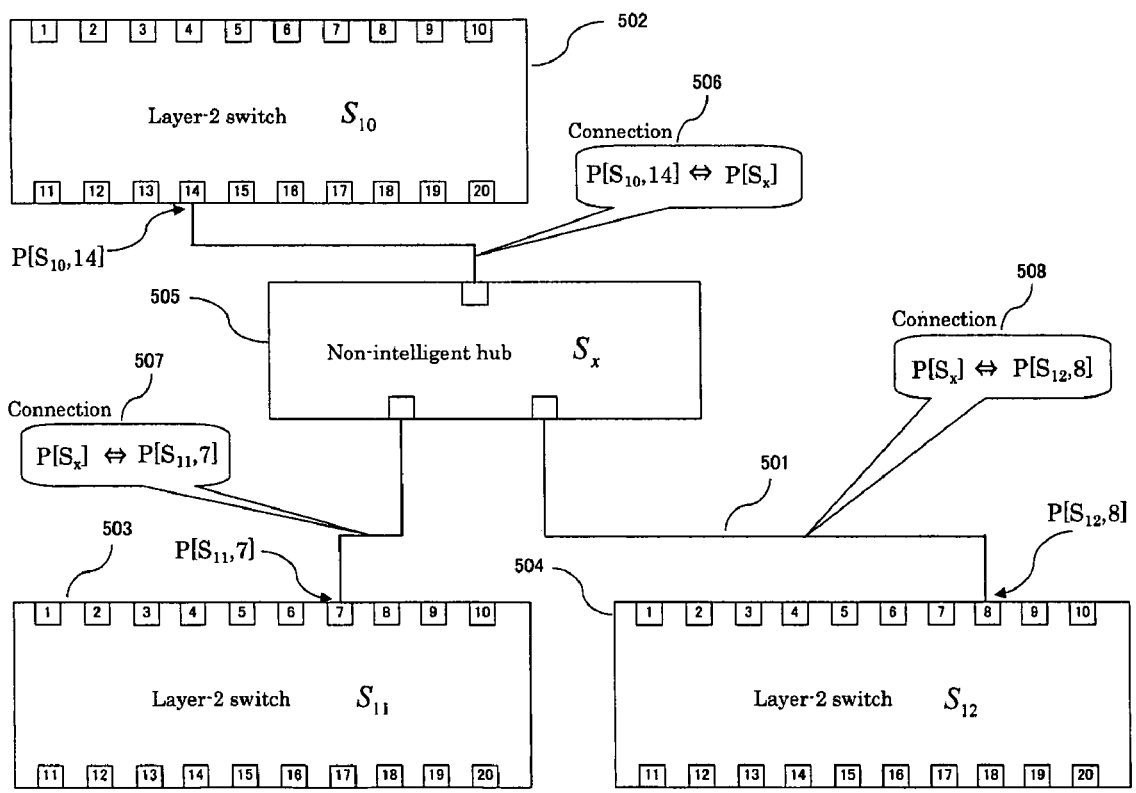
FIG. 5 is an example of the network configuration when there is a non-intelligent hub in the network, for a reference implementation of the present invention.

It is not shown in the flowchart, but, while synthesizing the connection, it is necessary to make amendments if there are non-intelligent switches in the network that do not support SNMP. In the example configuration shown in FIG. 5, the element P [$S_{10}$, 14] is present in the sets Row (M($S_{11}$)) and Row(M($S_{12}$)) and switch $S_{11}$ (503) and switch $S_{12}$ (504) both seem to be connected to port 14 of switch 10. This is indicative of the presence of a non-intelligent, non-SNMP-compliant hub (505) between switch 10 (502) and switch 11 (503) and between switch 10 (502) and switch 12 (504). In such cases the amendments to the connection information involves adding auxiliary connections P [$S_{10}$, 14]⇔ P [$S_x$], P [$S_x$]⇔ P [$S_{11}$, 7], P [$S_x$]⇔ P [$S_{12}$, 8]. Here $S_x$ is the non-intelligent, non-SNMP-compliant hub, and Sx is connected to port 14, 7 and 8 of switch 10 switch 11 and switch 8, respectively.

Using the abovementioned methods it is possible to easily discover the inter-connections of layer-2 switches.

In addition, if there are OSI Reference Model layer-3 elements (layer-3 switches) in the network, the inter-connection information of layer-2 switches of neighboring networks, connected via the layer-3 switch, may be synthesized using the aforementioned method via the layer-3 switch. By sending queries to the management IP addresses, the NMT can confirm the existence of layer-3 switches from the response of the layer-3 switches implementing SNMP agents.

Figure 6:
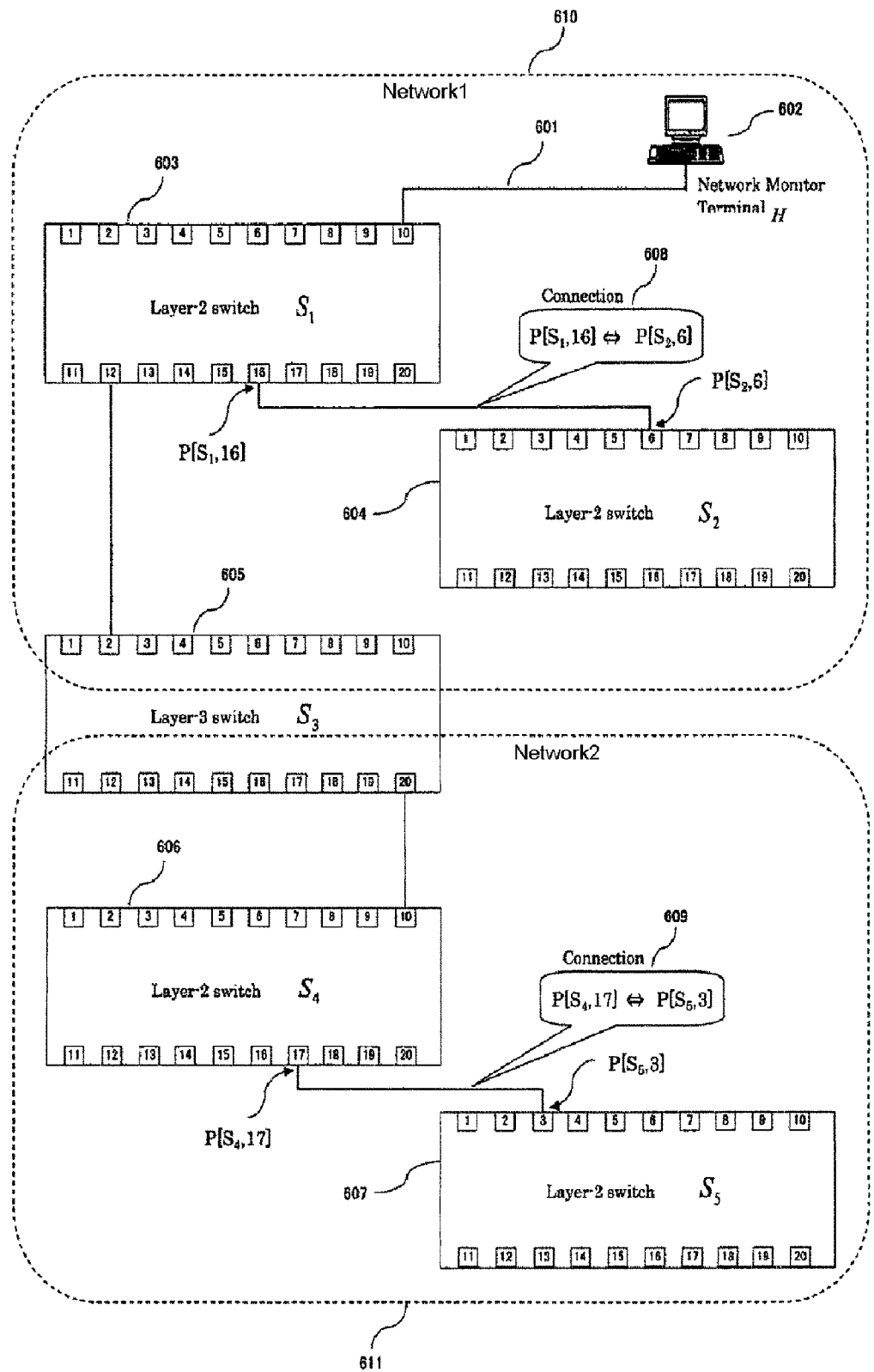
FIG. 6 is an example of the configuration with a OSI Reference model Layer-3 element in the network for a reference implementation of the present invention.

In case the network has a configuration as shown in FIG. 6, Network1 (610) and Network2 (611) are connected by the layer-3 switch $S_3$ (605). Using the aforementioned method the layer-2 switch inter-connection information P [$S_4$, 17]⇔ [$S_5$, 3] can be synthesized.

INDUSTRIAL APPLICABILITY

These days information networks are expanding in scale and increasing in complexity. For the efficient operation and management of these networks, tools for centralized management, developed by vendors and software houses, are being used. The present invention automatically detects network devices and computers connected to the network and, thereby automatically synthesizes the map of the entire network. It can automatically detect the presence of OSI Reference Model layer-2 switches and thereby easily generate the inter-connection information of the aforementioned layer-2 switches. The aforementioned network management tools used in conjunction with the technology of the present invention makes it possible to automatically synthesize and evaluate the detailed inter-connection status information of the switches in a large scale network, containing complexly inter-connected switches, and to generate the network map in a hierarchical manner. This will further the efficiency of network operation and management.

What is claimed is:

1. A Network Map generation method, characterized in that the OSI reference model layer-2 switches is automatically discovered and, the aforesaid layer-2 switches connection is automatically detected in the process of the Network Map automatic generation by automatic discovery of network devices or computers connected to the network, comprising:
    a first step is to use the network management information which the NMT (Network Monitor Terminal) obtains from the layer-2 switches, and generates the MvP table comprising of the mapping table M1 between the MAC address of the NMT and the ports of the layer-2 switches on which the aforesaid MAC address was detected and the table M2 mapping the MAC address of the layer-2 switches and the ports of the layer-2 switches on which the aforesaid MAC address was detected, and then,
    a second step is to compare the mapping table M1 and the mapping table M2 of the MvP table, and normalize the table by deleting an entry corresponding to a port from the mapping table M2 when the aforesaid port is seen in both the mapping table M1 and the mapping table M2, and detect automatically the connection information between the layer-2 switches by using the MvP table at the end of the normalization.

2. The Network Map generation method according to claim 1, characterized in that the aforesaid second step is, with the aforesaid MvP table,
    (1) The set of the layer-2 switch ports, Row[M(H)], on which the MAC address M(H) of the NMT H were seen and the set of layer-2 switch ports Row{M(Si)} on which the MAC addresses M(Si) of the layer-2 switch Si ($1 \leq 1 \leq$ number of layer-2 switches) were seen are compared, and then, if an entry corresponding to a port is seen in both the set Row[M(H)] and the set Row{M(Si)}, the aforesaid entry is deleted from the set Row{M(Si)}, and
    (2) In the set Row{M(Si)}, From the set Row{M(Sj)} ($1 \leq j \leq$ number of layer-2 switches) which has a singleton P[Sk,x] ($1 \leq k \leq$ number of layer-2 switches, x: port number), P[Sk,x] is selected, and
    (3) From the set Row{M(H)}, the element denoting the port P[Sj,y] [y: port number] of the layer-2 switch Sj is selected, and
    (4) The two elements selected by the aforesaid step yield the connection information P[Sk,x]⇔[Sj,y].

3. The Network Map generation method according to claim 2, characterized in that after the execution of aforesaid (4) of the aforesaid second step, the element P[Sk,x] from Row[M(Si)] is deleted and then, the aforesaid steps (2)~(4) are repeated, and executed till the number of elements in all the sets Row[M(Si)] is reduced to 0.

4. The Network Map generation method according to claim 2, characterized in that if the identical element exists in multiple sets of Row[M(Sj)], the conclusion is that at least one SNMP-disabled non-intelligent terminal exists between layer-2 switch Sj and layer-2 switch Sk, and then, the connection information having been described in the aforesaid (3)~(4) is corrected by considering the existence of a non-intelligent switch Sx.

5. The Network Map generation method according to claim 1, characterized in that in networks that have OSI reference model layer-3 switches, the NMT implementing the SNMP manager will send queries to the specified management IP address, from the response of the layer-3 switch implementing the SNMP agent the existence of the layer-3 switch is verified and the layer-2 switch connection information for networks connected via the layer-3 switch can be obtained in the same manner using the aforesaid first step and second step.

* * * * *